United States Patent
Lanagan et al.

(10) Patent No.: US 8,542,475 B2
(45) Date of Patent: Sep. 24, 2013

(54) SELF HEALING HIGH ENERGY GLASS CAPACITORS

(75) Inventors: Michael Lanagan, State College, PA (US); Carlo Pantano, Pennsylvania Furnace, PA (US); Hoi Kwan Lee, State College, PA (US); Ramakrishnan Rajagopalan, State College, PA (US); Nicholas Smith, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 315 days.

(21) Appl. No.: 12/900,976

(22) Filed: Oct. 8, 2010

(65) Prior Publication Data
US 2011/0085279 A1 Apr. 14, 2011

Related U.S. Application Data (60) Provisional application No. 61/250,314, filed on Oct. 9, 2009.

(51) Int. Cl.
*H01G 4/015* (2006.01)
*H01G 4/20* (2006.01)

(52) U.S. Cl.
USPC .......................................... 361/273; 361/320

(58) Field of Classification Search
USPC ...................................... 361/320, 321.1, 273
See application file for complete search history.

(56) References Cited

U.S. PATENT DOCUMENTS

| | | | | |
|---|---|---|---|---|
| 2,393,449 | A * | 1/1946 | Armistead, Jr. | 501/43 |
| 3,365,626 | A * | 1/1968 | Mohler et al. | 361/524 |
| 3,437,892 | A * | 4/1969 | Hoffman | 361/321.5 |
| 3,878,443 | A * | 4/1975 | Girard et al. | 361/320 |
| 4,105,810 | A * | 8/1978 | Yamazaki et al. | 427/255.32 |
| 4,824,808 | A * | 4/1989 | Dumbaugh, Jr. | 501/66 |
| 5,185,689 | A * | 2/1993 | Maniar | 361/313 |
| 6,088,216 | A * | 7/2000 | Laibowitz et al. | 361/321.4 |
| 6,144,546 | A * | 11/2000 | Mizushima et al. | 361/303 |
| 6,452,780 | B2 * | 9/2002 | Kobayashi et al. | 361/308.1 |
| 7,374,964 | B2 * | 5/2008 | Ahn et al. | 438/104 |

(Continued)

FOREIGN PATENT DOCUMENTS

| | | | |
|---|---|---|---|
| JP | 2009200224 A | * | 9/2009 |
| KR | 20040077309 A | * | 9/2004 |

OTHER PUBLICATIONS

N. J. Smith, B. Rangarajan, M. T. Lanagan, and C. G. Pantano, "Alkali-free glass as a high energy density dielectric material", Mate. Lett., 63, 1245-1248 (2009).

(Continued)

*Primary Examiner* — David M Sinclair
(74) *Attorney, Agent, or Firm* — Gifford, Krass, Sprinkle, Anderson & Citkowski, P.C.; Mark A. Harper (57) ABSTRACT

A self healing high energy glass capacitor is provided. The capacitor can have a glass layer with a top surface and a bottom surface. A top sacrificial layer can extend across the top surface and a bottom sacrificial layer can extend across the bottom surface. In addition, a top electrode can extend across the top sacrificial layer and a bottom electrode can extend across the bottom sacrificial layer. In some instances the glass capacitor has an energy breakdown of at least 6 joules per cubic centimeter.

18 Claims, 6 Drawing Sheets

(56) References Cited

U.S. PATENT DOCUMENTS

| | | | | |
|---|---|---|---|---|
| 7,442,633 B2* | 10/2008 | Bhattacharyya | | 438/597 |
| 2004/0195653 A1* | 10/2004 | Morozumi et al. | | 257/532 |
| 2008/0316680 A1* | 12/2008 | Iida et al. | | 361/523 |

OTHER PUBLICATIONS

J. Vermeer, "The impulse breakdown strength of pyrex glass", Physica, 20, 313-326 (1954).

A. V. Hippel and R. J. Maurer, "Electric Breakdown of Glasses and Crystals as a Function of Temperature", Phys. Rev. 59, 820-823 (1941).

F. Forlani and N. Minnaja, "Electric Breakdown in Thin Dielectric Films", J. Vac. Sci. Technol, 6, 518-526 (1969).

R. Gerson and T. C. Marshall, "Dielectric Breakdown of Porous Ceramics", J. Appl. Phys., 30, 1650-1653 (1959).

E. Furman, G. Sethi, B. Koch, and M. T. Lanagan, "Monte Carlo Modeling of Heterogeneities in Ceramic, Polymer, and Composite Capacitors", 17th Annual IEEE Pulsed Power Conference, Washington DC, Jun. 28-Jul. 2, 2009.

J. H. Tortai, N. Bonifaci, A. Denat, and C. Trassy, "Diagnostic of the self-healing of metallized polypropylene film by modeling of the broadening emission lines of aluminum emitted by plasma discharge", J. Appl. Phys., 97, 053304 (2005).

* cited by examiner

SELF HEALING HIGH ENERGY GLASS CAPACITORS

REFERENCE TO RELATED APPLICATION

This U.S. non-provisional utility patent application claims priority from U.S. provisional patent application Ser. No. 61/250,314 filed Oct. 9, 2009, the entire content of which is incorporated herein in its entirety.

GOVERNMENT INTEREST

This invention was made with government support under Contract No. N00014-05-1-0541, awarded by the Office of Naval Research. The Government has certain rights in the invention.

FIELD OF THE INVENTION

The present invention is directed to a glass capacitor, and in particular, to a self healing high energy glass capacitor.

BACKGROUND OF THE INVENTION

Thin glass sheets with an alkali-free composition are known to have exceptionally high dielectric breakdown strength (12 MV/cm) and electrostatic energy density values as high as 38 J/cm$^3$.[1] A key factor in achieving reproducible dielectric breakdown results for glasses is the sample thickness and surface condition. In the past, thin Pyrex sheets with high characteristic breakdown strength (9 MV/cm) and narrow breakdown distribution have been fabricated by blowing glass tubes and etching with hydrofluoric (HF) and hot chromic acids.[2] Similarly, dielectric breakdown strengths as high as 7 MV/cm have been reported for thin silica glass and quartz samples (50 μm) that were prepared by polishing in a manner that avoided the formation of microcracks.[3] Flat panel display glass production processes can provide commercially available glass sheets that are thin (e.g. 10-700 μm), defect-free and which possess flat, smooth pristine surfaces. As such, this type of glass has the potential to serve as high energy density capacitor materials for portable or pulsed power applications. Glass capacitors also have significant commercial potential for electric vehicles. The on-board electric power distribution systems require high temperature capacitors that operate reliably over 10 to 15 years.

A number of dielectric breakdown mechanisms have been proposed for amorphous oxides and the thickness of the oxide is known to play a key role in breakdown events that are mediated by thermal, electrical, and mechanical contributions.[4] In addition, breakdown processes originate with the creation of a critical quantity of high-mobility charges that increase over time. Breakdown is generally associated with regions of high local electric field originating from surface and bulk defects, microstructural inhomogeneities and space charges. Regardless of the initial breakdown mechanism, there is an increase of electrical conductivity followed by various phases of dielectric breakdown.

The dielectric thickness influences all phases of the breakdown sequence and both intrinsic and extrinsic breakdown mechanisms have a thickness dependence. Avalanche or catastrophic breakdown, initiated by current injection from a cathode, is inversely proportional to thickness.[5] Thermal breakdown is an interchange between joule heating and temperature dependent conductivity with the breakdown strength increasing as thickness decreases due to enhanced heat transfer to the ambient environment. The effect of porosity on dielectric breakdown has been extensively studied analytically for a uniform pore size distribution in a homogeneous dielectric and with Monte Carlo simulations which have shown that the breakdown strength is related to the pore size, distribution of pore sizes and the ratio of pore size to dielectric thickness.[6,7]

Appreciating that defects and/or failures can and do occur, self healing capacitor structures are designed such that metal electrodes recede from a channel in the dielectric layer at a fault site (so-called graceful failure). As a result, the capacitor remains operational with only a slight decrease in the capacitance value. Self healing has been observed for silicon and tantalum oxide dielectrics with aluminum electrodes having a layer thickness of less than 2000 Å.[8] Self healing in polymer film capacitors has been widely studied for dielectric layer thickness in the range of 1 and 20 μm.[9] The primary condition for self healing is that the electrostatic energy dissipated in the fault regions is sufficient to vaporize a metal electrode area around the fault channel.

However, heretofor self healing capacitor structures have yet to meet all of the requirements for successful commercial implementation (e.g. cost, temperature, reliability, etc.). Therefore, a self clearing high energy glass capacitor that affords desired self healing and reasonable cost would be desirable.

SUMMARY OF THE INVENTION

A high energy glass capacitor is disclosed. The capacitor can have a glass layer with a top surface and a bottom surface, and a top sacrificial layer extending across the top surface and a bottom sacrificial layer extending across the said bottom surface. A top electrode can extend across the top sacrificial layer and a bottom electrode can extend across the bottom sacrificial layer. The glass capacitor is self healing and can have an energy breakdown of at least 6 joules per cubic centimeter and is self clearing.

The glass layer may or may not be an alkali-free glass layer and can have a thickness of between 1 and 100 microns, inclusive. The top sacrificial layer and/or bottom sacrificial layer can have a thickness of between 10 nanometers and 5 microns, inclusive. In addition, the top sacrificial layer and/or bottom sacrificial layer can be made from organic or inorganic compounds, for example and for illustrative purposes only, organic layers (parylene, polyethyl cyanoacrylate, 3-aminopropyltriethoxy-silane, polyvinylidene fluoride, polystyrene, polyetheretherketone, polyvinyl alcohol, polydimethylsiloxane, polymethylmethacrylate, polyimide, polyetherimide etc.) a metal oxide ($MnO_2$, $VO_2$, $Nb_2O_5$, $Fe_2O_3$, $Fe_3O_4$, etc.), a metal nitride, metal nitride/oxynitride, carbide, carbide/oxynitride (AlN, AlON, SiC, SiOC, BN, aSiC), combinations thereof and the like. Such materials can participate in a selective ablation process or a redox reaction to promote self healing of the glass layer. In the alternative, the top sacrificial layer and/or bottom sacrificial layer can be made from a carbonaceous and/or graphitic compound, a polymer and the like, such types of material aiding in electrode removal from the fault region.

An interfacial bond layer can also be included and be located between the glass layer and the top sacrificial layer and/or bottom sacrificial layer. The interfacial bond layer can be made by from a highly polar molecule or a molecule with low polarity, depending on the adjoining layer to be bonded to the glass. For example and for illustrative purposes only, the interfacial bond layer can be a silane compound such as 3-aminopropyl-triethoxysilane (APTES) or heptadecafluoro-1,1,2,2-tetrahydrodecyltrimethoxysilane (HTDF). In the alternative, the interfacial bond layer can be a polymer and the polymer can be bonded to the glass layer using an interfacial silane coupling agent such as 3-mercapto-propyl-trimethoxy-silane (MPTMS).

DETAILED DESCRIPTION OF THE INVENTION

A self-healing high energy glass capacitor having utility as an electrical component is provided. In order to better teach and disclose the present invention, one or more embodiments and/or examples are provided.

Example Experimental Procedure—Glass Etching Process

Sheets of commercial alkali-free glass (AF45 Schott AG)[10] with original thickness of 50 μm was etched to various thicknesses between of 5 to 47 μm. For the purposes of the present invention, the term "alkali-free glass" is defined to be a silicate glass having negligible amounts of alkali constituents, for example $Na_2O$ and/or $K_2O$. The AF45 glass had a nominal composition (by mole %) of 63 $SiO_2$-12 BaO-16 $B_2O_3$-9 $Al_2O_3$.

Two different etching processes, one with and one without ultrasonic agitation, were employed using a commercial HF (48~51% purity, ARISTAR®) acid solution that was diluted with distilled water (acid contents of 2.5, 5.0 and 7.5 vol %). The diluted HF solutions were mixed using a magnetic stirrer for 10 min, and then all etching processes were carried out at room temperature. An AF45 glass sheet was held vertically in the HF solution with a Teflon basket. After 10 minutes, the glass sheet was rinsed with distilled water and methanol, and then dried with $N_2$ gas. This process was repeated every 10 minutes until the desired thickness was achieved with the glass sheet rotated in the basket to ensure uniform surface etching.

The same etching procedure was carried out with assistance of an ultrasonic treatment (Branson 1510, 40 kHz frequency) to decrease surface roughness as well as increase etch rate. It is appreciated that other etching and/or polishing processes known to those skilled in the art can be used to obtain thin or thinner thicknesses of glass sheet.

The thickness change and etch rate was determined by two measurement techniques, one being the use of a Fowler Sylvac Ultra Digit Indicator (Ultra-Digit Mark IV, Fowler Company Inc. Switzerland) and the other being scanning electron microscopy (SEM, Hitachs-3000H, Japan). The surface morphology and RMS roughness were characterized by Atomic force microscopy (AFM, Digital Instruments Dimension 2000, Veeco Instruments Inc., USA) and optical profilometry (Wyko NT 1100, Veeco Instruments. Inc., USA).

Example Experimental Procedure—Breakdown Measurement

Dielectric breakdown strength was measured for as-received and etched glass sheets having a nominal area of one square centimeter (1 cm$^2$). Arrays of gold top electrodes were patterned on the top surface of the glass (area=1.583 mm$^2$ and thickness=50 nm) by sputter deposition (Bal-Tec SCD 050 sputter coater). A bottom electrode was a continuous uniform coating of gold that was also sputter deposited. To investigate dielectric breakdown, a high-voltage power supply (TREK 30/20) generated 100 V/s ramp waveform and Galden® heat-transfer fluids were used as an insulating liquid. Typically 35 to 40 measurements were made per thickness of the glass and all measurements were made at room temperature.

After a breakdown, fault regions of a sample were investigated using an optical microscope, SEM, and profilometer (Tencor 500) to quantify the electrode area that was lost during breakdown. A process of self-healing and catastrophic breakdowns was studied and the relationship between thickness and self-healing breakdown was addressed using statistical data.

Etch Rate and Surface Roughness

Figure 1:
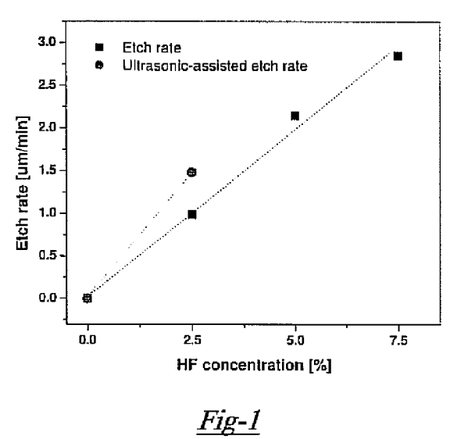
FIG. 1 is a graphical representation of the influence of HF concentration and ultrasound on etch rate.

In general, glass etch rate is a function of glass composition, etchant chemistry and etching temperature. The effect of HF concentration on the etch rate of the AF45 alkali-free glass is shown in FIG. 1. The etch rate is proportional to HF concentration, and increases from 0.986 μm/min to 2.846 μm/min with increasing HF concentration over the range 2.5 to 7.5 vol % HF. With the assistance of ultrasound agitation, the etch rate is increased by about 50%. In comparison to etch rates for fused silica and other multi-component silicate glasses, the etch rate for the alkali-free glass in HF solution is similar to high silica containing glass systems. S. T. Tso et al. reported that additions of intermediate or network modifier oxides to the $SiO_2$ glass increase the reactivity of the glass toward HF acid solutions.[11] H. Zhu et al. also reported that etch rate dramatically decreased from 36 μm/min for a D-263 substrate, which has a high alkali-oxide content, to 1 μm/min for fused silica. These studies imply that for the alkali-free glass, as $SiO_2$ content of the glass decreased from 100% (fused silica) to 50% (AF45) it becomes relatively easier for the glass to be etched with an HF solution.

Figure 2:
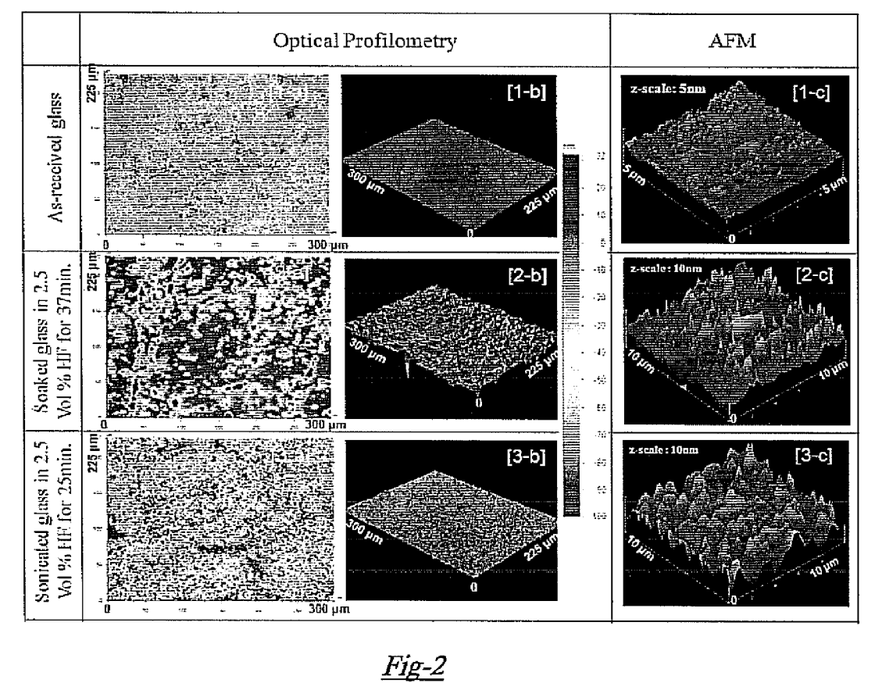
FIG. 2 is a series of surface images of as-received and etched glass sheets with corresponding RMS values shown in Table 1.

Surface morphology and roughness of the etched glasses were characterized using optical profilometry and atomic force microscopy (AFM) as complementary techniques. FIG. 2 shows images obtained on etched surfaces with and without ultrasonic agitation in 2.5 Vol % HF solution. All of the etching processes increased the surface roughness when compared with that of the as-received glass on a nanometer (nm) to micron (μm) scale (see FIG. 2). An important result is that the surface roughness of the ultrasonically etched glass is lower than glass etched without the ultrasonic treatment. The ultrasound-assisted etched glass surface is smoother because ultrasonic agitation removes reaction products from the surface during the etching process.[13]

Surface roughness data is summarized in Table 1. Representative root mean square (RMS) surface roughness values from FIG. 2 are shown in the table along with RMS values for multiple samples. To define ranges of RMS values using optical profilometry, 16 spots having an area 225 μm×300 μm were scanned. The same samples were also analyzed using AFM with scan sizes of 5 μm×5 μm and 10 μm×10 μm. Twenty (20) spots were measured for each area to determine the RMS ranges. The RMS range of etched glass increased in comparison with the pristine glass and the data showed the RMS values of the sonicated glass sheets were lower than that of the soaked (non-sonicated) glass sheets. Even though the ranges of roughness values obtained by AFM are larger compared to the values obtained by optical profilometry (due to smaller scan size), the specific effect of ultrasonication on the etched surfaces is clear.

down field decreased with increasing glass thickness, and the values were higher than $10^9$ V/m for glass thickness ≤20 μm. On the other hand, the breakdown voltage decreased with decreasing glass thickness. Oh et al.[14] reported that the breakdown strength is not an insulator's intrinsic property as its value depends on the insulator size (surface, length, thickness, mass) usually according to a power law. The present results also shows that the electric strength has a dependence on thickness and roughness of insulators. Furthermore, the thickness dependence of breakdown strength has been related to charge trapping and detrapping, and the charges for thinner specimens can flow easily because the trapped charges do not accumulate within the insulator due to its smaller thickness. Therefore a higher electric field is needed to induce electrical breakdown.[15,16] In addition, it is appreciated that the permittivity of the glass layer can play a role in the electrical breakdown thereof.

TABLE 1

| Measurement type | Surface Roughness (nm) | Pristine Glass Surface | Etched Glass Surface | |
|---|---|---|---|---|
| | | | 2.5 Vol. % HF | 2.5 Vol. % HF & Ultrasonic |
| Optical Profilometry (image size: 225 μm × 300 μm) | RMS (FIG. 2) & RMS range (measured in this study) | 0.23 nm (FIG. 2, 1-b) 0.14~0.32 nm | 5.33 nm (FIG. 2, 2-b) 1.69~11.95 nm | 2.15 nm (FIG. 2, 3-b) 1.71~2.85 nm |
| AFM (image size: 5 × 5 μm/10 × 10 μm) | | 0.41 nm (FIG. 2, 1-c) 0.28~0.47 nm | 6.53 nm (FIG. 2, 2-c) 5.25~16.27 nm | 4.21 nm (FIG. 2, 3-c) 1.66~7.42 nm |

Roughness and Thickness Dependence of Dielectric Breakdown

Turning now to Table 2, the effect of surface roughness on breakdown strength for 15 μm thick glass sheets is shown. As shown by the data in the table, surface roughness is an important factor for the dielectric breakdown. Not being bound by theory, surface roughness contributes to nonuniformity of electric field distribution and charge injection at the metal/glass interfaces. In addition, surface roughness can have a mechanical aspect related to the failure of a glass layer. The glass sonicated in 2.5 Vol % HF solution had ~3 nm RMS, and the glasses soaked in 2.5 Vol % HF static showed a relatively rough surface above 5 nm RMS. Interestingly, the glasses etched in 5 and 7.5 Vol % HF solution have a comparatively low roughness compared with the glass etched in 2.5 Vol % HF solution and the RMS was approximately 3~6 nm. The roughness dependence of breakdown strength is also summarized in Table 2. It is seen that the breakdown strength is slightly dependent on the RMS values; while the standard deviation and Weibull modulus are more strongly affected by the surface roughness.

TABLE 3

| Glass thickness (μm) | | Breakdown Voltage (V) | Breakdown Field (V/m) | Weibull Modulus |
|---|---|---|---|---|
| Etched | 6 | 6982 ± 825 | $1.16 \times 10^9 \pm 1.38 \times 10^8$ | 7.81 |
| | 10 | 10228 ± 1248 | $1.08 \times 10^9 \pm 1.31 \times 10^8$ | 9.01 |
| | 15 | 15295 ± 1646 | $1.05 \times 10^9 \pm 1.13 \times 10^8$ | 9.41 |
| | 20 | 20594 ± 2949 | $1.03 \times 10^9 \pm 1.47 \times 10^8$ | 7.30 |
| | 25 | 20785 ± 3516 | $8.31 \times 10^8 \pm 1.41 \times 10^8$ | 6.66 |
| | 30 | 22748 ± 3214 | $7.58 \times 10^8 \pm 1.07 \times 10^8$ | 7.80 |
| As-received | 50 | 20836 ± 2481 | $4.17 \times 10^8 \pm 4.96 \times 10^7$ | 8.86 |

The Weibull modulus values varied in the range 6.66~9.41; however, no correlation between the thickness and Weibull modulus was found. The 30 μm thick glass has a smoother surface compared to the 6 μm thick glass, which was etched for a longer time. However the Weibull modulus was unchanged with thickness as shown in Table 3. Another common contributor to breakdown for all glass samples is the

TABLE 2

| | RMS(nm) (optical profilometry) | $E_{char}$ (V/m) | STDEV (V/m) | Weibull Modulus |
|---|---|---|---|---|
| 2.5 Vol. % HF & Ultrasonic | 1.86~2.71 | $1.14 \times 10^9$ | $8.57 \times 10^7$ | 13.50 |
| 5~7.5 Vol. % HF | 3.30~3.50 | $1.14 \times 10^9$ | $1.28 \times 10^8$ | 9.286 |
| | 4.51~4.55 | $1.07 \times 10^9$ | $1.39 \times 10^8$ | 6.756 |
| 2.5 Vol. % HF | 5.27~5.51 | $9.52 \times 10^8$ | $2.72 \times 10^8$ | 3.372 |
| | 9.13~10.08 | $9.77 \times 10^8$ | $2.12 \times 10^8$ | 3.908 |

The breakdown strength and Weibull modulus gathered as a function of thickness have been summarized in Table 3. Here, only samples with 3 nm or less surface roughness (prepared with ultrasonic etching) were tested. The breakexistence of surface contamination such as dust particles and chemical impurities which can create a common extrinsic mechanism that would produce similar Weibull modulus values.

Figure 3:
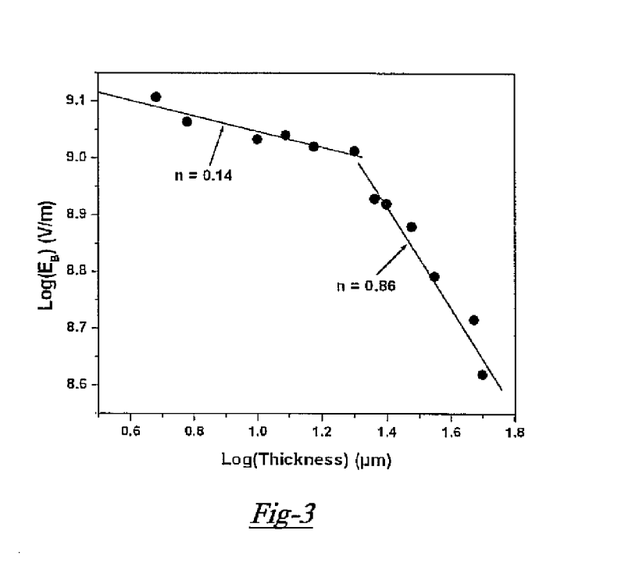
FIG. 3 is graph of log(breakdown field[$E_B$]) vs. log(thickness) for an electrode area and thickness of 1.583 mm$^2$ and 50 nm, respectively, on 5 to 50 μm thick glass sheets produced by an etch process and commercial as-received 50 μm glass sheet.

FIG. 3 is a plot of log breakdown voltage ($E_B$) vs log thickness (d) for glass having thicknesses of 5 to 50 µm. Using the relation $E_B \propto d^{-n}$, a power law dependence was obtained with $E_B$ found to be proportional to $d^{-0.14}$ for lower thicknesses of glass and $d^{-0.86}$ for higher thicknesses. It is known that the dependence of breakdown field upon the dielectric thickness "d" generally fits an empirical power-law dependence.[5,17-20] For example, F. Forlani et al.[5] have reported that the breakdown mechanism of the polycrystalline $Al_2O_3$ and $SiO_2$ films changes depending on the film thickness with a dependence of $d^{-1/4}$ for lower thicknesses and for higher thicknesses the electric strength varies as $d^{-1/2}$.

This model combines electrode emission due to tunneling or Schottky emission with avalanche in the bulk and as such differs from classical avalanche models which rely on impact ionization in the bulk alone. Inclusion of electrode contribution makes this model less likely to be applicable to fairly thick and highly insulating glasses. However, the slope for greater thicknesses, n=0.86, is fairly close to the prediction of steady-state thermal breakdown, which for a thick dielectric is the limiting factor in the dissipation of energy. For such a case, n is predicted to be 1. Furthermore, for the case of nonlinear conductivity, a deviation from n=1 is expected.

In a separate study, nonlinear space charge limited conduction with hopping carrier transport has been determined to be the most likely conduction mechanism in these glasses.[21] In particular, both experimental results and modeling indicates that current rises faster than Ohmic as field is raised across the glass capacitor. The nonlinear conduction should more strongly affect breakdown at smaller thicknesses since breakdown strength is higher in thinner samples.

The net result of nonlinear conductivity is to somewhat reduce n with the reduction being the strongest the higher nonlinearity is in conduction. With regard to n being close to zero for smaller thickness, this behavior can be anticipated in a dielectric with a considerable space charge effect. If the breakdown is triggered by a large local field near one of the electrodes, for example, only a weak thickness dependence of breakdown is likely. Although the breakdown mechanism in the glass is not known for sure, it does appear there are two distinct mechanisms in this alkali-free glass with a transition between them at 20 µm thickness.

Figure 4:
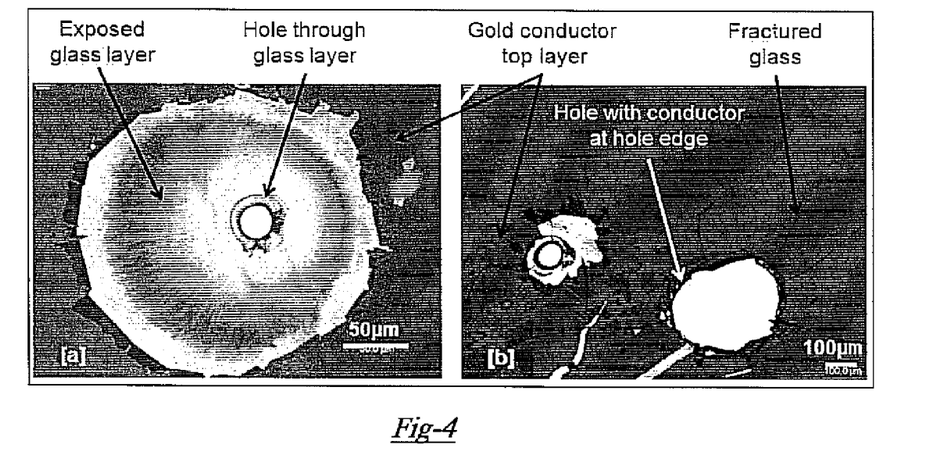
FIG. 4 are SEM images for: (a) graceful: and (b) catastrophic dielectric failure modes in a 15 μm thick glass layer with an evaporated 50 nm thick gold electrode.

After obtaining breakdown measurements, samples were investigated with an optical microscope to observe damage created due to dielectric breakdown. In general, the breakdown resulted in a single-hole through the thickness of the glass capacitor (FIG. 4). However, this graceful failure was not observed in all cases. In other samples, the breakdown created a short due to cracking of the glass and inadequate clearing of the conductive electrode away from the failure origin.

FIG. 4a shows a classic graceful failure mode with a significant clearing of the electrode away from the glass and very little damage to the glass. It is noted that the hole has a ring of glass that has been melted and vaporized during the breakdown event. This was the most common kind of graceful failure mode observed (see also FIG. 5). FIG. 4b illustrates extended fracture due to thermal shock with the electrodes covering the entire glass layer except for the hole created by breakdown. It is seen that significant cracking around the hole of FIG. 4b has occurred and catastrophic breakdown having multiple cracks was observed mostly in thicker glass samples. Such a mechanical crack in brittle materials easily arises during a breakdown event and is the result of mechanical stresses induced by Joule heating. Klein and Pietrkowski analyzed the thermal stresses arising when the breakdown current is flowing axially in a cylindrical volume. They found that the transient temperature increase caused by the breakdown current produces radial pressure and transient tangential tensile stresses in the vicinity of the current path.[8]

Figure 5:
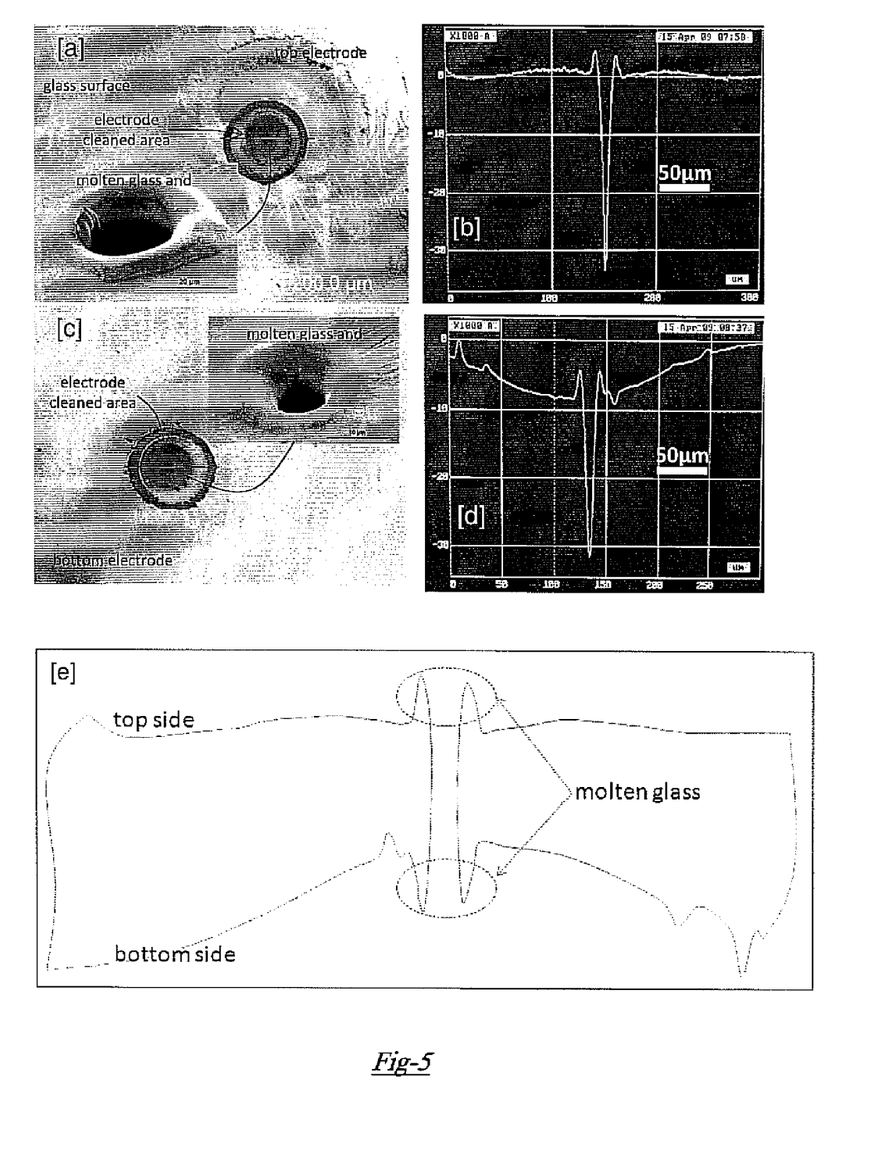
FIG. 5 is a plurality of images for graceful dielectric failure of a 10 μm thick glass with 50 nm thick electrode illustrating: (a) a top glass surface and top electrode; (b) a profilometer profile of the top glass surface; (c) a bottom glass surface and bottom electrode; (d) a profilometer profile of the bottom; and (e) a schematic cross section at a breakdown hole.

FIG. 5 shows an SEM image and morphology of a hole produced by self-healing breakdown. A ring around the hole on top and bottom sides of the glass was formed by vaporized and/or melted glass during the breakdown event and there was no conducting path between opposite electrodes. The reported average temperature of a Metal-Oxide-Silicon (MOS, Al electrode) sample during breakdown event is about 4000 K-4500 K and the pressure at these temperatures is very high. Thus it could be expected that there is an explosive nature for single-hole breakdowns. The profilometer results show that glass adjacent the bottom electrode moved up to the top electrode. FIG. 5 also shows that a circle of glass 300 µm in diameter around the hole was deformed and created a ring having a height of 4.5-5 µm. FIG. 5e shows a schematic cross section at a breakdown hole.

Figure 6:
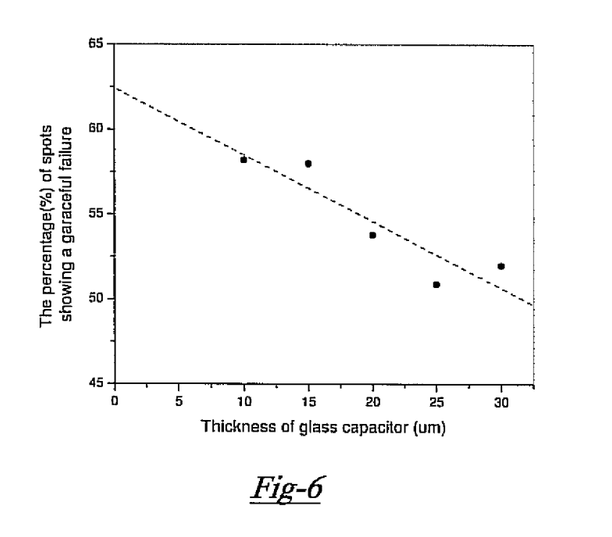
FIG. 6 is a graph illustrating the percentage (%) of spots showing graceful failure as a function of sample thickness.

Visual damage for 56 to 120 spots for each breakdown event was inspected and categorized as either self healing (FIG. 4a) or catastrophic (FIG. 4b.). The percentage of self-healing spots plotted as a function of sample thickness is shown in FIG. 6. The percentage of self-healing spots increased with decreasing glass thickness and reached 58% for a glass thickness of 10 µm.

The condition for self-healing breakdown is reported by Ref. 8 and is given by:

$$\frac{\varepsilon_0 \varepsilon \rho_m A_c \log(A_c/A_m)}{8\pi \rho_i h_m^2} F_B^2 \geq q_m \quad (1)$$

where $A_c$ and $A_m$ are the capacitor area and metal hole area, respectively; $h_m$ is the thickness of a metal electrode; $\rho_m$ and $\rho_i$ are the resistivity of metal and insulator channel, respectively, on breakdown; $\varepsilon_0$ and $\varepsilon$ are the permittivity of free charge and the relative permittivity, respectively; and $q_m$ is the latent heat of vaporization of the metal. The left side of the equation is the energy delivered to the self healing process and the right side of the equation is the amount of energy required for electrode clearing.

Figure 7:
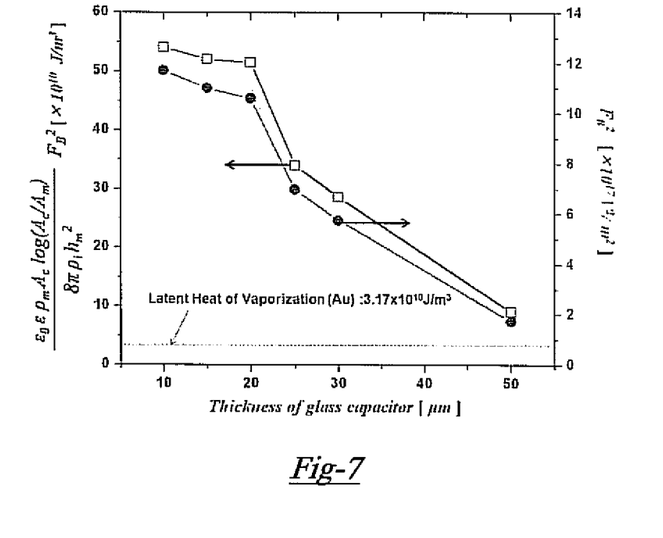
FIG. 7 is a graph illustrating experimental values for self-healing breakdown as a function of glass thickness.

The area of the hole evaporated ($A_m$) in the electrodes should be significantly larger than the cylindrical hole of area $A_s$ in the insulator after discharging. Equation 1 shows that the likelihood of graceful failure is proportional to the square of breakdown field ($F_B$). The left term of equation (1) was calculated with experimental data as a function of glass thickness and is shown in FIG. 7. In the calculation, the increase of dielectric constant according to temperature was not taken into account. The estimated resistivity of a gold electrode ($1\times10^{-5}$ Ωcm) and glass ($1\times10^2$ Ωcm) at 1500 K were used as the resistivity of metal/insulator channel on breakdown.[22-24] The values of the left term (condition for self-healing breakdown) increases with decreasing glass thickness which is primarily correlated with the electric field, $F_B^2$.

Equation 1 also supports the fact that self healing is promoted for additional energy terms on the left side of the equation. For example, a favorable chemical reaction (e.g. redox reaction) will increase the magnitude of the left side of equation 1. Ablation processes will decrease the value of the right side of equation 1, effectively increasing the driving force for self healing.

The high dielectric breakdown strength in conjunction with a relatively high permittivity, results in energy densities of 38 J/cm$^3$.[1] The local energy released during breakdown heats the electrode and glass in the defect region. Therefore, the self-healing condition is determined by the breakdown strength of glass for a given electrode composition and thickness.

Gold electrodes were used in this study and the electrostatic energy supplied during breakdown exceeds the latent heat of vaporization of gold ($3.17 \times 10^{10}$ J/m$^3$) for all cases. The latent heat of vaporization of quartz, which has a high melting temperature compared to the glass used in this work, is $1.57 \times 10^{10}$ J/m$^3$.[25,26] This result supports that the hole with ring observed in FIGS. 4 and 5 after breakdown event could be formed by vaporization of glass.

Figure 8:
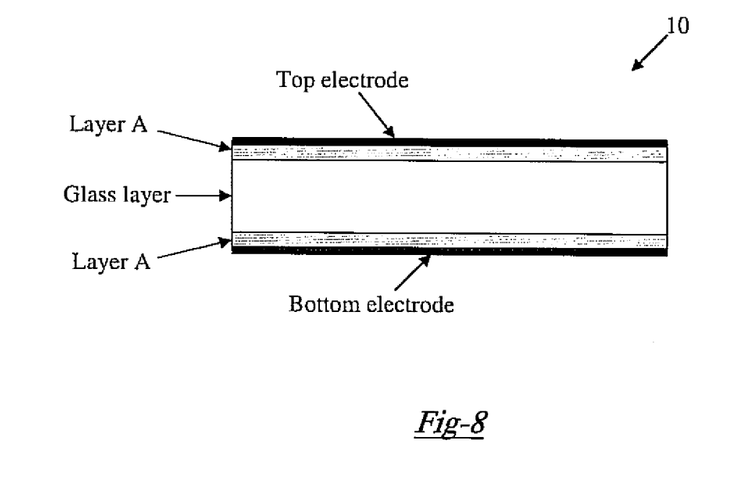
FIG. 8 is schematic drawing of a capacitor having sacrificial layers that promote self healing.

One embodiment of a self clearing high energy glass capacitor is shown generally at reference numeral 10 in FIG. 8. The capacitor 10 has a glass layer with a layer A attached to one side and another layer A attached to opposite side. Extending across the layers A is a top electrode and a bottom electrode as illustrated in the figure. In some instances, the top and/or bottom electrode is a continuous uniform layer, however this is not required.

The glass layer can have a thickness between 1 and 100 microns and the layer A can have a thickness between 10 nanometers and 5 microns. The electrode layers are designed to promote graceful failure as described above and can have a layer thickness in the range of 5 to 20 nanometers, for example 10 nanometers. In some instances, the glass layer has a thickness between 1 and 50 microns and/or the layer A has a thickness between 10 nanometers and 1 micron. In other instances, the glass layer has a thickness between 3 and 30 microns and/or the layer A has a thickness between 10 and 500 nanometers. In still other instances, the glass layer has a thickness between 5 and 20 microns and/or the layer A has a thickness between 10 and 100 nanometers.

In some instances, commercially available alkali-free glass can be etched as taught above to produce 5 to 100 micron thick layers. The glass is then coated with layer A, which helps promote self clearing. Layer A can be deposited onto the glass layer, or on interfacial bond layers described in greater detail below, using any method known to those skilled in the art, illustratively including by chemical solution methods, chemical vapor deposition, physical vapor deposition and/or by surface treatment techniques. The electrodes can be made from aluminum, niobium, tungsten, copper, gold, silver and alloys thereof and can be applied, attached, deposited, etc., using any method or technique known to those skilled in the art. In addition, it is appreciated that a capacitor can be made from a plurality of layers in order to form a stack of the glass layers having the layers A and electrodes.

Figure 9:
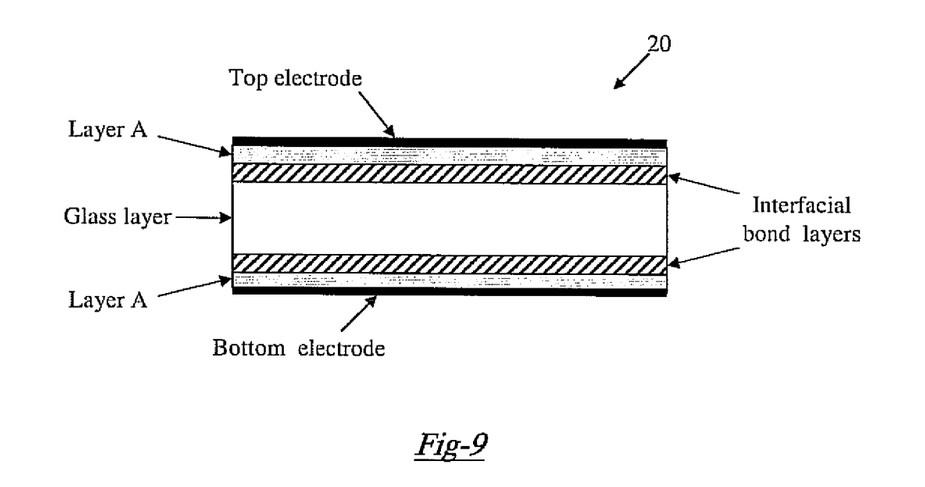
FIG. 9 is a schematic drawing of the capacitor shown in FIG. 8 with the addition of a thin layer having a known molecular polarity used to control interfacial bond characteristics between the glass layer and the sacrificial layers.

Another embodiment of a self clearing high energy glass capacitor is shown generally at reference numeral 20 in FIG. 9. The capacitor 20 is similar to the capacitor 10, with the addition of interfacial bond layers between the glass layer and the layer A. The interfacial bond layer can have a thickness in the nanometer range, for example, between 2 to 10 nanometers, 2 to 8 nanometers, 4 to 6 nanometers, and the like.

The capacitor 10 and/or 20 withstands high voltage over long periods of time and can achieve an electric field equal to or above 6 J/cm$^3$ in a fully packaged capacitor. Layer A can be a material that provides an exothermic reaction upon failure of the glass, the exothermic reaction enhancing the evaporation or phase change of the electrode and thus clearing the region around the failure location/defect. Layer A can be an inorganic material/compound, such as a metal oxide ($MnO_2$, $VO_2$, $Nb_2O_5$, $Fe_2O_3$, $Fe_3O_4$, etc.), a metal nitride, metal nitride/oxynitride, carbide, carbide/oxynitride (AlN, AlON, SiC, SiOC, BN, aSiC) and the like. Carbonaceous and graphitic compounds can also be used for layer A and thus provide a combustion source to remove the top and/or bottom electrodes. Layer A can also be a polymer, such as a vapor phase deposited polymer (e.g. parylene, Polyethyl cyanoacrylate,) and/or a solution deposited polymer/fluoropolymer (e.g. polyvinylidene fluoride, polystyrene, polyvinyl alcohol, polydimethyl siloxane, polymethyl methacrylate, polyimide, polyetherimide etc., 3-aminopropyltriethoxy-silane,).

Regarding the interfacial bond layer, a range of polar molecules can be bonded to the glass layer. For example and for illustrative purposes only, highly polar 3-aminopropyl-triethoxysilane (APTES) or low polarity heptadecafluoro-1,1, 2,2-tetrahydrodecyltrimethoxysilane (HTDF) can be attached to a hydroxylated glass surface. In addition, polymer layers can bond to the glass through an interfacial silane coupling agent and the electrical properties of the laminate can be controlled through the interfacial bond layer.

Figure 10:
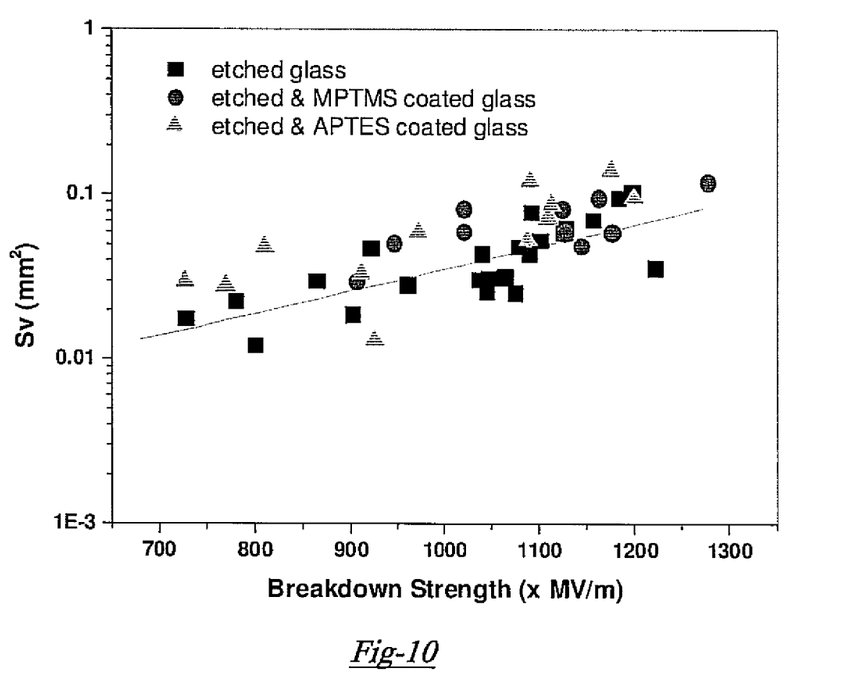
FIG. 10 is a graph illustrating enhanced clearing area (Sv) as a function of breakdown strength for etched plus coated glass.

FIG. 10 illustrates clearing area (Sv) as a function of breakdown strength for plain etched glass, etched glass with an 3-mercapto-propyl-trimethoxy-silane (MPTMS) coating and etched glass with an APTES coating. As shown in this figure, the etched glass with an interfacial bond coating provides a higher clearing area than the uncoated glass, thereby showing the improvement of interfacial bond layer use.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. As such, the claims, including all equivalents, define the scope of the invention.

REFERENCES

1. N. J. Smith, B. Rangarajan, M. T. Lanagan, and C. G. Pantano, "Alkali-free glass as a high energy density dielectric material", Mate. Lett., 63, 1245-1248 (2009).
2. J. Vermeer, "The impulse breakdown strength of pyrex glass", Physica, 20, 313-326 (1954).
3. A. V. Hippel and R. J. Maurer, "Electric Breakdown of Glasses and Crystals as a Function of Temperature", Phys. Rev. 59, 820-823 (1941).
4. J. J. O'Dwyer, "The theory of electrical conduction and breakdown in solid dielectrics", Oxford University Press, 1973.
5. F. Forlani and N. Minnaja, "Electric Breakdown in Thin Dielectric Films", J. Vac. Sci. Technol. 6, 518-526 (1969).
6. R. Gerson and T. C. Marshall, "Dielectric Breakdown of Porous Ceramics", J. Appl. Phys., 30, 1650-1653 (1959).
7. E. Furman, G. Sethi, B. Koch, and M. T. Lanagan, "Monte Carlo Modeling of Heterogeneities in Ceramic, Polymer, and Composite Capacitors", 17th Annual IEEE Pulsed Power Conference, Washington D.C., Jun. 28-Jul. 2, 2009.
8. N. Klein, "Advances in Electronics and Electron Physics", pp. 309-424, 26, Academic Press, New York, 1969.
9. J. H. Tortai, N. Bonifaci, A. Denat, and C. Trassy, "Diagnostic of the self-healing of metallized polypropylene film by modeling of the broadening emission lines of aluminum emitted by plasma discharge", J. Appl. Phys., 97, 053304 (2005).
10. E. Thiénot, F. Domingo, E. Cambril, and C. Grosse, "Reactive ion etching of glass for biochip applications: Composition effects and surface damages", Microelectronic Engineering, 83, 1155-1158 (2006).
11. S. T. Tso, and J. A. Pask, "Reaction of glasses with hydrofluoric acid solution", J. Am. Ceram. Soc., 65, 360-362 (1982).

12. H. Zhu, M. Holl, T. Ray, S. Bhushan, and D. R. Meldrum, "Characterization of deep wet etching of fused silica glass for single cell and optical sensor deposition", J. Micromech. Microeng. 19, 065013 (2009).
13. H. K. Jang, Y. D. Chung, S. W. Whangbo, Y. S. Lee, I. W. Lyo, C. N, Whang, S. J. Lee, and G. Kim, "Effects of chemical etching with sulfuric acid on glass surface", J. Vac. Sci. Technol. A, 18, 401-404 (2000).
14. K. H. Oh, C. K. Ong, and B. T. G. Tan, "Variation of trapping/detrapping properties as a function of the insulator size", J. Appl. Phys., 74, 1960-1967 (1993).
15. H. Thou, F. G. Shi, and B. Zhao, "Thickness dependent dielectric breakdown of PECVD low-k carbon doped silicon dioxide dielectric thin films: modeling and experiments", Microelectronics Journal, 34 259-264 (2003).
16. H. K. Kim, and F. G. Shi, "Thickness dependent dielectric strength of a low-permittivity dielectric film", IEEE Trans. Dielectr. Electr. Insulat., 8, 248-252 (2001).
17. A. D. Milliken, A. J. Bell, and J. F. Scott, "Dependence of breakdown field on dielectric (interelectrode) thickness in base-metal electrode multilayer capacitors", Appl. Phys. Lett., 90, 112910 (2007).
18. H. Zhou, F. G. Shi, and B. Zho, "Thickness dependent dielectric breakdown of PECVD low-k carbon doped silicon dioxide dielectric thin films: modeling and experiments", Microelectronics Journal, 34 259-264 (2003).
19. A. D. Milliken, A. J. Bell, and J. F. Scott, "Dependence of breakdown filed on dielectric (interelectrode) thickness in base-metal electrode multilayer capacitors", Appl. Phys. Lett., 90 112910-112913 (2007).
20. C. H. Huang, and V. K. Agarwal, "Thickness dependence of a direct current breakdown filed in stearic acid films", J. Vac. Sci. Technol. A, 3 2000-2003(1985).
21. H. K. Lee, C. G. Pantano, M. T. Lanagan, and E. Furman, "Space Charge Limited Current in Thin Alkali-Free Glass", J. Appl. Phys., to be submit.
22. D. L. Decker, and H. B. Vanfleet, "Melting and High-Temperature Electrical Resistance of Gold under Pressure", Phys. Rev., 138 A129-A133 (1965).
23. http://hypertextbook.com/facts/2004/JennelleBaptiste.shtml
24. Application information: Schott AF45, SCHOTT North America, Inc., http://www.us.schott.com/special_applications/english/products/thinglass/af45/index.html.
25. D. B. Chang, J. E. Drummond, and R. B. Hall, "High-Power Laser Radiation Interaction with Quartz", J. Appl. Phys., 41 4851-4855 (1970).
26. Y. G. Basov, and S. A. Boldyrev, "Heat losses in Xenon flash lamp with short discharge time", J. Appl. Spectrosc., 39 1252-1256 (1979).
27. B. Walgenwitz, and J. H. Tortai, et al., "Self-healing of metallized polymer films of different nature", 2004 International Conference on Solid Dielectrics, Toulouse, France. 29-32 (2004).

We claim:
1. A self healing high energy glass capacitor comprising:
   an alkali-free glass layer having a top surface and a bottom surface;
   a top sacrificial layer extending across and in contact with said top surface;
   a bottom sacrificial layer extending across and in contact with said bottom surface;
   a top electrode extending across said top sacrificial layer;
   a bottom electrode extending across said bottom sacrificial layer; and
   upon energy breakdown of said alkali-free glass layer at least one of said top sacrificial layer and said bottom sacrificial layer have a self healing property selected from the group consisting of selective ablation to promote self healing of said alkali-free glass layer, redox reacting to promote self healing of said alkali-free glass layer, and exothermic reacting to enhancing evaporation or phase change of at least one of said top electrode and said bottom electrode to clear a region around a failure location/defect and aiding in electrode removal from said fault region;
   said glass capacitor has an energy breakdown of at least 6 joules per cubic centimeter.
2. The high energy glass capacitor of claim 1, wherein said glass layer has a thickness of between 1 and 100 microns, inclusive.
3. The high energy glass capacitor of claim 1, wherein said top sacrificial layer and said bottom sacrificial layer has a thickness of between 10 nanometers and 5 microns, inclusive.
4. The high energy glass capacitor of claim 3, wherein said top sacrificial layer and/or said bottom sacrificial layer is an inorganic compound.
5. The high energy glass capacitor of claim 4, wherein said inorganic compound is selected from a group consisting of a metal oxide, a metal nitride, metal nitride/oxynitride, carbide, carbide/oxynitride and combinations thereof.
6. The high energy glass capacitor of claim 3, wherein said top sacrificial layer and/or said bottom sacrificial layer is a carbonaceous and/or graphitic compound.
7. The high energy glass capacitor of claim 3, wherein said top sacrificial layer and/or said bottom sacrificial layer is a polymer.
8. The high energy glass capacitor of claim 1, further comprising an interfacial bond layer between said glass layer and said top sacrificial layer and/or said bottom sacrificial layer.
9. The high energy glass capacitor of claim 8, wherein said interfacial bond layer contains a polar molecule.
10. The high energy glass capacitor of claim 9, wherein said polar molecule is selected from a group consisting of a high polar molecule and a low polar molecule.
11. The high energy glass capacitor of claim 9, wherein said polar molecule is selected from a group consisting of 3-aminopropyl-triethoxysilane (APTES) and heptadecafluoro-1,1,2,2-tetrahydrodecyltrimethoxysilane (HTDF).
12. The high energy glass capacitor of claim 8, wherein said interfacial bond layer is a polymer.
13. The high energy glass capacitor of claim 12, wherein said polymer is bonded to said glass layer using an interfacial silane coupling agent.
14. The high energy glass capacitor of claim 12, wherein said interfacial silane coupling agent is 3-mercapto-propyl-trimethoxy-silane (MPTMS).
15. The high energy glass capacitor of claim 1, wherein said top surface and/or said bottom surface of said alkali-free glass layer has a root mean square (RMS) surface roughness of less than 10 nm.
16. The high energy glass capacitor of claim 1, wherein said top surface and/or said bottom surface of said alkali-free glass layer has an RMS surface roughness of less than 6 nm.
17. The high energy glass capacitor of claim 1, wherein said top surface and/or said bottom surface of said alkali-free glass layer has an RMS surface roughness of less than 5 nm.
18. The high energy glass capacitor of claim 1, wherein said top surface and/or said bottom surface of said alkali-free glass layer has an RMS surface roughness of less than 4 mm.

* * * * *